H. THOMAS.
SPINDLE HOLDER.
APPLICATION FILED JAN. 15, 1919.
1,345,284.
Patented June 29, 1920.
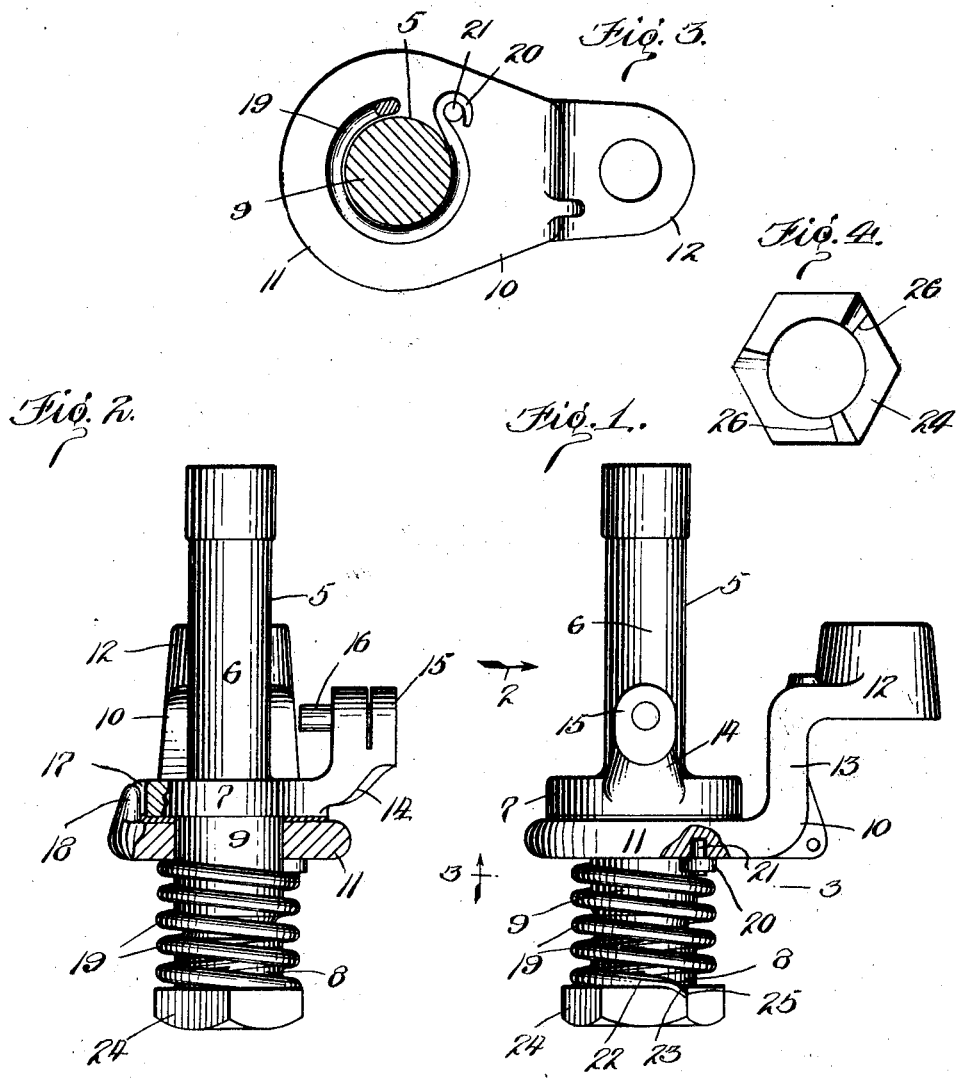
Inventor,
Hugh Thomas
By his Attorneys
Edgar Tate & Co

UNITED STATES PATENT OFFICE.

HUGH THOMAS, OF CHINCHILLA, PENNSYLVANIA.

SPINDLE-HOLDER.

1,345,284.  Specification of Letters Patent.  Patented June 29, 1920.

Application filed January 15, 1919. Serial No. 271,329.

*To all whom it may concern:*

Be it known that I, HUGH THOMAS, a citizen of the United States, and residing at Chinchilla, in the county of Lackawanna and State of Pennsylvania, have invented certain new and useful Improvements in Spindle-Holders, of which the following is a specification, such as will enable those skilled in the art to which it appertains to make and use the same.

This invention relates to spindle holders and particularly to devices of this class used in connection with silk machinery or machinery used in manufacturing silk or what is known as throwing silk, but which may also be used in connection with spindle holders of cotton and linen manufacturing machinery; and the object of the invention is to provide a spindle holder of the class and for the purpose specified with means for locking the spindle holder nut against movement or detachment from the holder thereby effecting a great saving in the cost of production, repairs of parts and considerable labor as well as facilitating the proper production of the product manufactured, or avoiding the defective production caused by the loosening of said nut which permits of the movement of the spindle and spindle holder out of plumb or alinement; and a further object of the invention is to provide an improved nut locking means in devices of the class specified which is simple in construction and operation and efficient in use.

The invention is fully disclosed in the following specification, of which the accompanying drawing forms a part, in which the separate parts of my improvement are designated by suitable reference characters in each of the views, and in which;

Figure 1 is a side view of a spindle holder and bracket showing my improvement in operative position;

Fig. 2 a view looking in the direction of the arrow 2 of Fig. 1 and with part of the construction broken away and in section;

Fig. 3 a partial section on the line 3—3 of Fig. 1; and,

Fig. 4 a bottom plan view of a nut similar to that shown in Figs. 1 and 2 but showing a modification.

In the accompanying drawing, I have shown at 5 a spindle holding device similar to that now used in connection with silk manufacturing machinery or what is known as silk throwing machinery. The spindle holding device comprises a shaft portion 6 which forms the support for the spindle and has an enlarged cylindrical flanged portion 7 centrally thereof, and at the opposite side of which is a cylindrical and threaded stud portion 8 on the shank 9 of which is mounted a bracket 10 having a large cylindrical head portion 11 at one end and a smaller cylindrical head portion 12 at its other end, said head portions being connected by a web construction 13 bent at right angles to the head portions 11 and 12. The enlarged flange portion 7 is provided on one side with an upwardly directed arm 14 having a cylindrical head 15 in which is mounted a pin 16 and at its opposite side with a recess 17 adapted to receive an upwardly directed finger 18 on the enlarged cylindrical head portion 11 of the bracket 10.

All of the construction above described is the same as now employed in spindle holding devices used in machinery of the class specified, and substituted for the usual spring and nut mounted on the threaded stud 8 is a spiral spring 19, the lower end of which is bent to form an eye-loop 20 to receive a pin 21 secured in the top face of the large head portion 11 of the bracket 10, as clearly shown in Figs. 1 and 3, and the other end portion of the spring is reduced as shown at 22, and the free end thereof bent into a downwardly curved finger 23. A nut 24 preferably of the hexagon type is threaded to engage the threaded stud 8 and to be moved longitudinally thereof by a suitable wrench device. In the construction shown in Figs. 1 and 2, the nut is provided at a predetermined point with a V-shaped recess 25 in the bottom face thereof in connection with which the curved finger 23 on the upper end of the spring 19 is adapted to operate to lock the nut against downward movement on the threaded stud 8, or against loosening when once moved into the position shown in Figs. 1 and 2.

With my improved spring and nut construction for spindle holders, said holders may be firmly locked or retained in the brackets 10 under the tension of the spring 19 by the nut 24 without danger of said nut 24 becoming loose in the operation of the spindle holder by the machine, and it will be noted that my improvement may be applied to the usual spindle holders at a small cost without defacing or injuring the spindle holder in any way and without affecting the use or operation thereof.

In Fig. 4 of the drawing I have shown a slight modified form of nut 24 which consists simply in providing a plurality of V-shaped notches or recesses 26 in the bottom face of the nut instead of one notch 25 as shown in Figs. 1 and 2, and with this form of construction a finer adjustment of the nut 24 may be obtained.

It will be understood that while I have shown my improvement in connection with a specific form of spindle holder, the same may be used in connection with any device of this class, or in connection with any device where a nut is employed in connection with a spiral spring and locked by the engagement of one end of said spring therewith.

Having fully described my invention, what I claim as new and desire to secure by Letters Patent, is:—

In a device of the class described, a threaded member, a support in which said member is mounted, a pin on said support, a nut mounted on and threaded to correspond with said member and provided with a recess, and a spiral spring mounted on said member between said support and said nut, one end of said spring being provided with a loop or eye adapted to engage the pin connected with said support and the other end of said spring being provided with a finger adapted to engage the recess in said nut to lock the same against movement on said member in one direction.

In testimony that I claim the foregoing as my invention I have signed my name in presence of the subscribing witnesses this 6th day of January 1919.

HUGH THOMAS.

Witnesses:
M. V. MORRIS,
CHARLES RAINE.